United States Patent
Chase et al.

(10) Patent No.: US 7,946,535 B2
(45) Date of Patent: May 24, 2011

(54) HIGHLY EFFICIENT SUPERSONIC LAMINAR FLOW WING

(75) Inventors: James D. Chase, Reno, NV (US); Michael Henderson, Piedmont, SC (US); Peter Sturdza, Atherton, CA (US)

(73) Assignee: Aerion Corporation, Reno, NV (US)

(*) Notice: Subject to any disclaimer, the term of this patent is extended or adjusted under 35 U.S.C. 154(b) by 709 days.

(21) Appl. No.: 11/974,802

(22) Filed: Oct. 16, 2007

(65) Prior Publication Data

US 2009/0206206 A1 Aug. 20, 2009

Related U.S. Application Data

(60) Provisional application No. 60/852,929, filed on Oct. 18, 2006.

(51) Int. Cl.
*B64C 9/00* (2006.01)
(52) U.S. Cl. .......... 244/215; 244/199.4; 244/35 R; 244/130
(58) Field of Classification Search ........... 244/215, 244/217
See application file for complete search history.

(56) References Cited

U.S. PATENT DOCUMENTS

| | | | | |
|---|---|---|---|---|
| 2,136,845 | A | * | 11/1938 | Fenton .................. 244/90 R |
| 5,282,591 | A | * | 2/1994 | Walters et al. .......... 244/199.1 |
| 5,322,242 | A | | 6/1994 | Tracy |
| 5,518,204 | A | | 5/1996 | Tracy |
| 5,681,013 | A | * | 10/1997 | Rudolph .................. 244/214 |
| 5,897,076 | A | | 4/1999 | Tracy |
| 6,089,502 | A | * | 7/2000 | Herrick et al. .......... 244/35 R |
| 6,149,101 | A | | 11/2000 | Tracy |
| 6,935,592 | B2 | * | 8/2005 | Morgenstern et al. ...... 244/89 |

* cited by examiner

*Primary Examiner* — Tien Dinh
*Assistant Examiner* — Michael Kreiner
(74) *Attorney, Agent, or Firm* — William W. Haefliger

(57) ABSTRACT

An improved supersonic laminar flow wing structure, on a supersonic aircraft, having one or more of the following: a strake extending forwardly of the wing inboard extent, a raked wing tip, a reversed fillet at the strake or fuselage junction, an inboard leading edge flap extending over less than about 15% of the inboard wing panel span, and a hybrid plain-split flap having a lower surface portion deflectable downwardly relative to plain flap extent.

15 Claims, 2 Drawing Sheets

Figure 2:
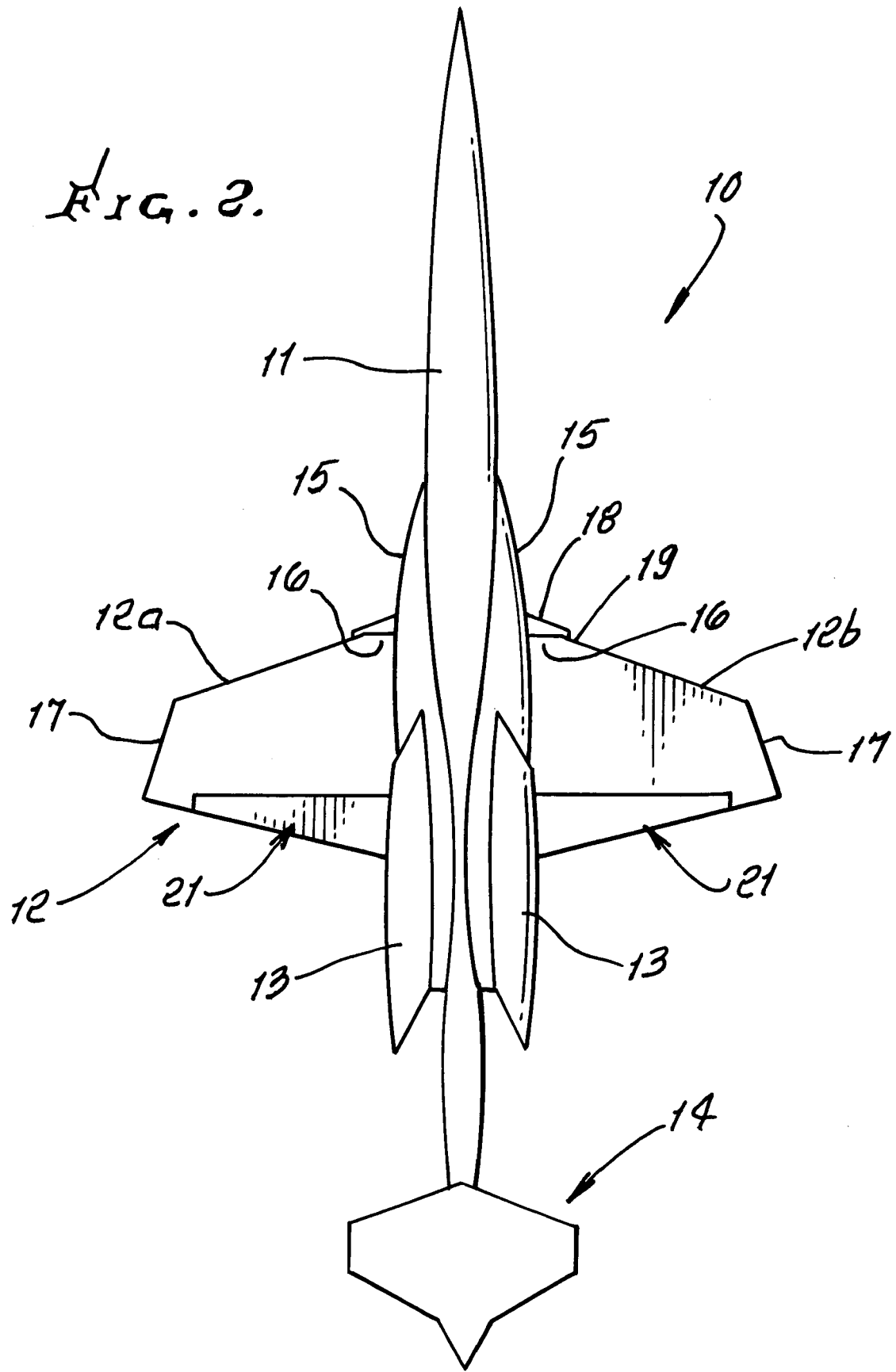

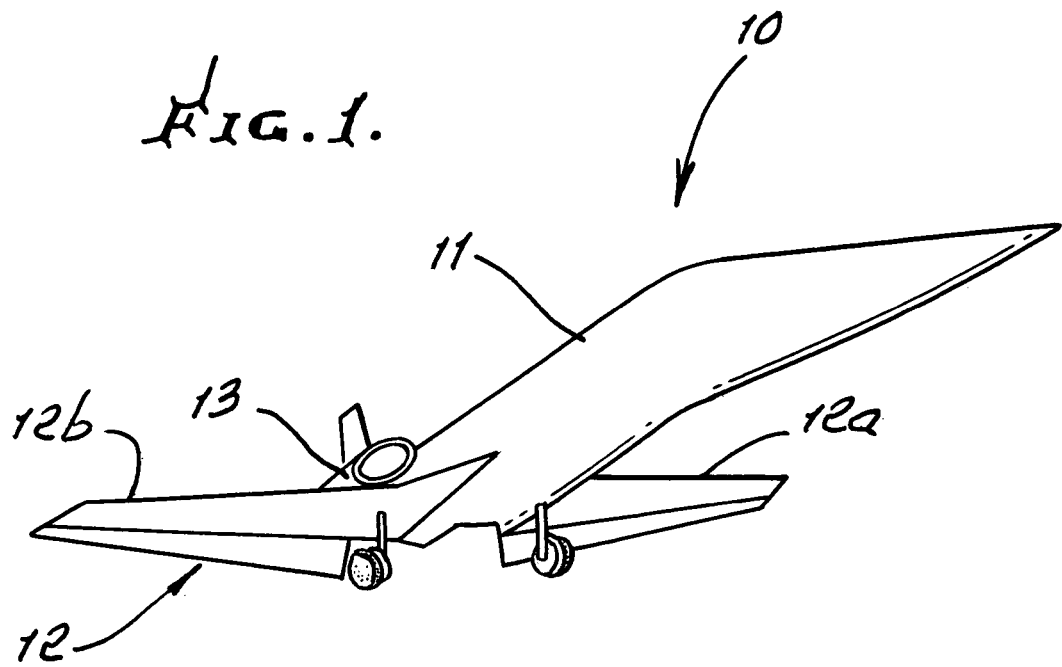
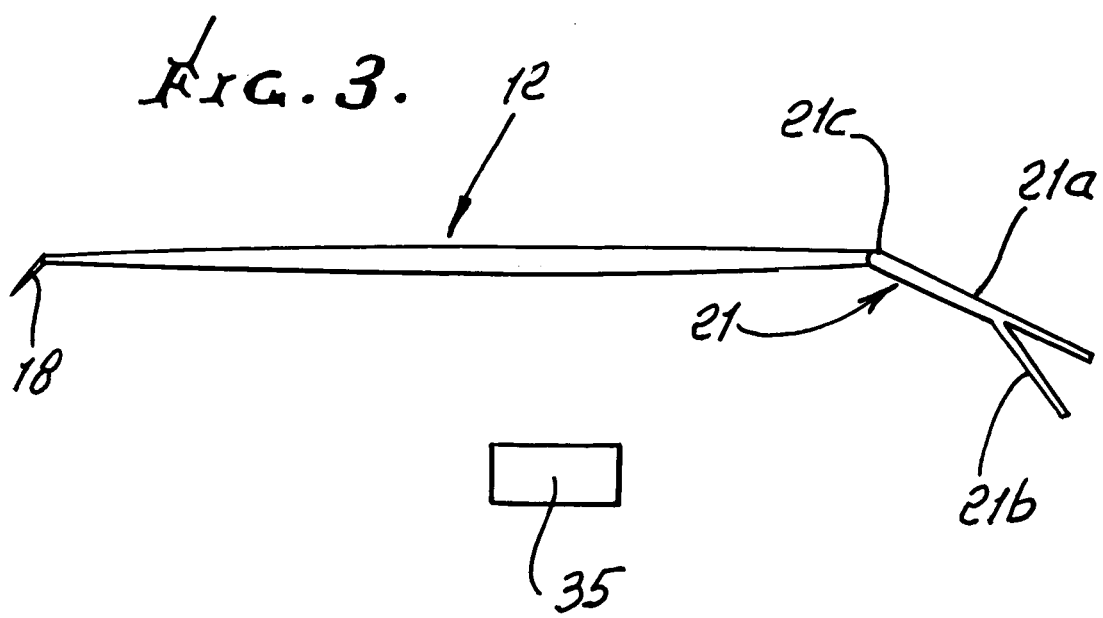

HIGHLY EFFICIENT SUPERSONIC LAMINAR FLOW WING

This application claims priority from U.S. provisional application, Ser. No. 60/852,929, filed Oct. 18, 2006.

BACKGROUND OF THE INVENTION

This invention relates generally to efficient, supersonic, laminar flow aircraft wing configurations. More specifically it concerns improvements in the following configuration areas:
 a) strake,
 b) raked wing tip,
 c) reversed fillet wing-strake junction,
 d) inboard leading edge flap,
 e) hybrid plain-split flap.

Certain prior Richard Tracy patents disclose a laminar flow wing for efficient supersonic flight (U.S. Pat. Nos. 5,322,242, 5,518,204, 5,897,076 and 6,149,101). Recent developments have led to five areas of improvement, principally benefiting low speed characteristics of aircraft using the wing. The wing described in the prior Tracy patents has a sharp, modified biconvex airfoil, with less than about 30 degrees leading edge sweep in order to maintain an attached shock at supersonic cruise conditions, and thickness-chord ratio (t/c) of about 2% or less as a span-wise average over the majority of the wing. The latter excludes a zone near the inboard end, which may be thicker, up to about 4% t/c in combination with fuselage area ruling.

There are several unique characteristics of the supersonic laminar flow wing which pose challenges, especially in low speed flight. These include its sharp leading edge which causes a separation "bubble" at almost any angle of attack in subsonic flight, its extremely thin airfoil which imposes a structural weight penalty as aspect ratio is increased, and the un-swept leading edge which limits the effectiveness of "area ruling" the wing-body for minimizing supersonic wave drag. These (and other characteristics) are unique to the supersonic laminar wing and are substantially mitigated by the herein claimed improvements, acting individually or together, in combination with this type of wing.

SUMMARY OF THE INVENTION

Two of such improvements utilize features which have been used in aircraft design, but not in conjunction with the supersonic laminar flow wing under consideration. These are a "strake" and a "raked" tip. Three additional features are unique to the supersonic laminar wing. These are a "reverse fillet", a deployable flap at the inboard end of the leading edge, and a hybrid plain-split flap system. All five are described below.

Strake

The strake is a highly swept portion of the wing between the fuselage and the inboard end of the un-swept main wing panel. The strake's leading edge is preferably swept forward of the wing to an intersection with the fuselage, and its trailing edge may be a continuation of the outer wing trailing edge, or may be swept further aft to a fuselage intersection. The leading edge is preferably swept more than the Mach angle at the maximum supersonic cruise speed in order to have a "subsonic leading edge". This condition assures a detached shock wave and permits the leading edge of the strake to be somewhat blunt and cambered for less supersonic drag, and enhanced low speed lift capability of the wing, or its maximum "lift coefficient".

The strake performs several functions in addition to increasing maximum lift in the present application, while favorably affecting supersonic cruise performance. These are as follows: 1. Increases the span of the wing for improved lift efficiency with less structural weight penalty, 2. Improves the longitudinal distribution of fuselage and wing cross sectional area for lower supersonic wave drag, 3. Provides additional volume for fuel in the forward part of the aircraft, 4. Creates a vortex at moderate and high angles of attack in subsonic flight which tends to keep the flow attached over the upper inboard wing surface for better lift and engine inlet flow quality, 5. Helps maintain laminar flow over the inboard portion of the wing, and 6. Provides a structural hard point for landing gear mounting and space for gear retraction.

Raked Tip

The "raked tip" is a highly swept lateral edge, or wing tip, of the wing, which may have either a sharp or slightly blunted edge as long as it has more sweep than the Mach angle at the maximum cruise speed. The tip adds two important attributes to the type of wing under consideration.

It adds to the span and thus the aspect ratio without as much associated drag-causing wetted area and structural bending as would a conventional rounded or blunt tip. More importantly, in low speed flight it generates a "rolled up" vortex at up to moderate angles of attack, which remains attached to the upper surface of the wing tip. The attached tip vortex delays the growth of the leading edge separation bubble and resultant loss of lift over the outer portion of the wing. This, in turn, increases the maximum lift of the wing and prevents, or delays, the inboard movement of the tip vortex associated with loss of outer wing lift. The result is a lower downwash derivative with angle of attack over the horizontal tail, providing greater longitudinal stability and reduced tendency to pitch up.

Reversed Fillet

The wing-strake (or wing fuselage) junction on most aircraft is subject to detail treatment in form of a "fillet" or concave surface blending smoothly with the wing and fuselage surfaces. This fillet is generally associated with a concave curve in plan view between the leading edge and the fuselage.

For the laminar flow wing the necessity of avoiding excessive boundary layer cross-flow can be very difficult at the wing leading edge to strake (or fuselage) junction because the large up-wash at the junction causes Mach waves (pressure disturbances) and locally higher chord-wise pressure gradients on the wing surface. These effects can cause locally critical levels of boundary layer cross-flows, which can in turn destabilize the laminar flow over a substantial portion of the inner wing, resulting in a turbulent boundary layer and higher skin friction drag. However by making the leading edge profile convex at the strake (or fuselage) junction, so as to eliminate, or even slightly reverse, the sweep locally at the strake junction, cross-flows can be reduced to below critical levels and transition to turbulence substantially reduced.

Inboard Leading Edge Flap

A second consequence of the strong up-wash near the leading edge junction with the strake (or fuselage), in combination with the sharp leading edge is a premature growth of the leading edge separation "bubble" leading to early loss of lift over the inboard portion of the wing. This results in a delay of maximum lift to high angles of attack. Full span leading edge flaps can delay the formation and growth of the leading edge "bubble", but such devices are mechanically awkward with the very thin, sharp leading edge of the laminar wing, and are difficult, if not impossible, to implement without any surface gap or disturbance which would preclude laminar flow.

A more practical solution is a leading edge flap extending over only the inboard 15%, or so, of the wing panel span outboard of the strake or fuselage. Such a device, for example a Kruger flap extending forward of the leading edge, has been shown by proprietary tests to be very effective on this type of wing. It can be deployed from the strake (or fuselage) with a minimum of leading edge mechanization by various means, such as moving the flap laterally from a cavity in the strake (or fuselage), or by swinging it about a vertical pivot axis from a stowed position in the strake (or fuselage).

Hybrid Plain-Split Flap

The thin laminar flow wing is not suited to multi-element slotted flaps, slotted fowler flaps, or even "zap" flaps, because of lack of interior space and the undesirability of external hinges and tracks. For these reasons a plain hinged trailing edge flap is the most practical approach. However the lift increment which can be generated, especially with the sharp leading edge wing, is limited by separation of the flap upper surface.

A simple split flap (lower surface only deflected) has slightly higher maximum lift capability than a plain flap, but at a penalty in drag. In any case, a split flap would not be consistent with the need for small amounts of flap deflection for efficient subsonic and transonic cruise, which is required for most applications of the laminar supersonic wing.

For this type of wing a hybrid combination of split and plain flap offers unique advantages. The hybrid split flap is configured such that a portion of the flap lower surface can deflect down relative to the plain flap. The split flap hinge line can be co-located with the plain flap hinge, or preferably aft of it, near mid chord of the plain flap. When deflected, the split flap delays separation on the upper surface of the plain flap by lowering the wake pressure and reducing the adverse pressure gradient at the flap upper surface trailing edge. Since the outer portions of the plain flap are the most vulnerable to such separation, the split flap also mitigates tip stall and the increased downwash that would result as described in connection with the raked tip above.

DRAWING DESCRIPTION

FIG. 1 herein shows a supersonic aircraft wing, strake, flap and leading edge flap;

FIG. 2 is a plan view of a supersonic wing showing locations of the FIG. 3 flap structure; and FIG. 3 is a section view of the wing airfoil of a supersonic laminar flow wing, showing trailing edge and inboard leading edge flap structures.

DETAILED DESCRIPTION

In the drawings, the preferred supersonic aircraft 10 has a fuselage 11, thin, laminar flow wing 12 including left and right wing sections 12*a* and 12*b*, jet engines 13 closely proximate opposite sides of the fuselage, and tail 14.

The strake is shown at 15, as a highly swept portion of the wing between the fuselage 11 and the inboard end 16 of the low sweep main wing panel. Other strake characteristics are referred to above.

The raked tip of each wing section is shown at 17, and has characteristics as referred to above.

Reversed fillet configuration, for each strake-fuselage junction leading edge, is indicated at 19, and has characteristics as referred to above.

The inboard leading edge flap is shown, for each wing section, at 18, and has characteristics as referred to above, and may have association with cavities in the fuselage or strake.

Hybrid plain-split flap, for each wing section, is provided at 21, and has characteristics as referred to above, and includes plain flap 21*a* and split flap 21*b*. Suitable actuators for the flaps are indicated schematically at 35, and may have association cavities in the fuselage or strake. The hinge line for 21*b* is at 21*c*. In FIG. 3, the hinge line for the split flap may be co-located at or aft of 21*c*, with respect to plain flap 21*a*.

In FIG. 3, plain flap 21*a* is downwardly deflected by a first angle relative to a plane substantially coincident with the plane of wind and split flap 21*b* is downwardly deflected by a second angle relative to said plane, where the second angle exceeds the first angle.

Similar relationships exist where the hinge line for the split flap is co-located at 21*c*.

We claim:

1. Improved supersonic laminar flow wing structure, on a supersonic aircraft, having in combination the following:
   a) strake extending forwardly of the wing inboard extent,
   b) raked wing tip,
   c) reversed fillet at strake junction with the wing leading edge,
   d) there being inboard wing panel span, and including inboard leading edge flap extending over less than about 15% of said inboard wing panel span,
   e) hybrid plain-split flap associated with the wing and having a lower surface portion deflectable downwardly relative to plain flap extent, said plain flap having a rearward terminal edge, and said split flap extending rearwardly from a forwardmost hinge locus proximate mid-chord of said plain flap, and forward of said terminal edge,
   f) and wherein the plain flap is positioned to be downwardly deflected at a first angle and the split flap is positioned to be downwardly angled below the plain flap, the plain flap having substantial bodily flatness throughout the majority of its chordal length.

2. The combination of claim 1 wherein the strake has a leading edge swept more than the Mach angle at maximum supersonic speed of the aircraft.

3. The combination of claim 1 wherein the raked wing tip has
   i) more sweep than the Mach angle maximum cruise speed of the supersonic aircraft.

4. The combination of claim 3 wherein said reverse fillet has a convex leading edge profile at said junction.

5. The combination of claim 4 wherein said hybrid plain-split flap is a trailing edge flap and has the following:
   i) a plain flap hinge line,
   ii) a split flap hinge line located aft of the plain flap hinge line.

6. The combination of claim 1 wherein said reverse fillet has a convex leading edge profile at said junction.

7. The combination of claim 1 wherein said inboard leading edge flap is positioned for deployment;
   i) about a pivot axis associated with the strake or fuselage.

8. The combination of claim 1 wherein said hybrid plain-split flap is a trailing edge flap and has the following:
   i) a plain flap hinge line,
   ii) a split flap hinge line located aft of the plain flap hinge line.

9. The combination of claim 1 wherein said inboard leading edge flap is positioned for deployment from one of the following:
   i) a well in the strake or fuselage,
   ii) about a pivot axis associated with the strake or fuselage.

10. The combination of claim 1 wherein the plain flap has a hinge line, said split flap has a hinge line, and said hinge lines are co-located.

11. The combination of claim 1 wherein the wing has leading edge sweep of less than about 30°.

12. The combination of claim 1 wherein the strake has leading edge angularity over about 50°.

13. The combination of claim 12 wherein the wing has leading edge sweep of less than about 30°.

14. Improved supersonic laminar flow wing structure, on a supersonic aircraft, having in combination the following:
   a) a fuselage,
   b) raked wing tip,
   c) reversed fillet at fuselage junction with the wing leading edge,
   d) there being inboard wing panel span and including inboard leading edge flap extending over less than about 15% of said inboard wing panel span,
   e) hybrid plain-split flap associated with the wing and having a lower surface portion deflectable downwardly relative to plain flap extent, said plain flap having a rearward terminal edge, and said split flap extending rearwardly from a forwardmost hinge locus proximate mid-chord of said plain flap, and forward of said terminal edge,
   f) and wherein the plain flap is postitioned to be downwardly deflected at a first angle and the split flap is positioned to be downwardly angled below the plain flap, the plain flap having substantial bodily flatness throughout the majority of its chordal length.

15. The combination of claim 14 wherein said reverse fillet has a convex leading edge profile at said junction.

\* \* \* \* \*